(12) United States Patent
Nakama et al.

(10) Patent No.: US 10,101,541 B2
(45) Date of Patent: Oct. 16, 2018

(54) OPTICAL FERRULE AND OPTICAL CONNECTOR

(71) Applicant: FUJIKURA, LTD., Tokyo (JP)

(72) Inventors: Akihiro Nakama, Sakura (JP); Tatsuya Ohta, Sakura (JP); Kunihiko Fujiwara, Sakura (JP); Takanobu Mikami, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/669,709

(22) Filed: Mar. 26, 2015

(65) Prior Publication Data

US 2015/0198772 A1 Jul. 16, 2015

Related U.S. Application Data

(63) Continuation-in-part of application No. 13/728,413, filed on Dec. 27, 2012.

(30) Foreign Application Priority Data

Dec. 27, 2011 (JP) ................................. 2011-286577

(51) Int. Cl.
*G02B 6/36* (2006.01)
*G02B 6/38* (2006.01)
*G02B 6/42* (2006.01)

(52) U.S. Cl.
CPC ......... *G02B 6/3861* (2013.01); *G02B 6/3853* (2013.01); *G02B 6/3885* (2013.01); *G02B 6/4214* (2013.01)

(58) Field of Classification Search
None
See application file for complete search history.

(56) References Cited

U.S. PATENT DOCUMENTS 6,101,306 A * 8/2000 Engstrand ............ G02B 6/3636
 385/137
7,603,021 B2 * 10/2009 Watanabe ................ G02B 6/30
 385/137

(Continued)

FOREIGN PATENT DOCUMENTS

JP   2000-180660 A   6/2000
JP   2003-043304 A   2/2003

(Continued)

OTHER PUBLICATIONS

JP 2009-258510 machine translation.*

(Continued)

*Primary Examiner* — Chris Chu
(74) *Attorney, Agent, or Firm* — Westerman, Hattori, Daniels & Adrian, LLP

(57) ABSTRACT

An optical ferrule and an optical connector are provided, which make it possible to reduce the labor required for an adhesive wiping operation even when the optical ferrule is small-sized. A first adhesive filling recess 113 is equipped, which is formed at an outlet of an optical fiber hole 112 so that a forward end of a bare fiber 120, which is positioned by the optical fiber hole 112, is allowed to abut against an inner wall 113*w* opposed to the outlet, and the bare fiber 120 is adhered and fixed in a resultant state by means of an adhesive 131 with which the recess is filled, wherein the first adhesive filling recess 113 is provided with adhesive accommodating recesses 115, 117 which are shallower than the first adhesive filling recess 113 and are disposed continuously with the first adhesive filling recess 113.

6 Claims, 5 Drawing Sheets

(56) References Cited

U.S. PATENT DOCUMENTS

| | | | |
|---|---|---|---|
| 2001/0026663 A1* | 10/2001 | Kim | G02B 6/29358 |
| | | | 385/76 |
| 2007/0025663 A1* | 2/2007 | Kuroda | G02B 6/30 |
| | | | 385/49 |
| 2010/0220957 A1* | 9/2010 | Asahi | G02B 6/423 |
| | | | 385/39 |

FOREIGN PATENT DOCUMENTS

| | | |
|---|---|---|
| JP | 2005-172990 A | 6/2005 |
| JP | 2009-258510 A | 11/2009 |

OTHER PUBLICATIONS

U.S. Office Action dated Oct. 31, 2014 issued in co-pending U.S. Appl. No. 13/728,413.

Office Action dated Mar. 3, 2015, issued in corresponding Japanese Patent Application No. 2011-286577 with English translation (8 pages).

\* cited by examiner

OPTICAL FERRULE AND OPTICAL CONNECTOR

CROSS REFERENCE TO RELATED APPLICATIONS

This application claims the benefits of Japanese Patent Application No. 2011-286577, filed on Dec. 27, 2011, and U.S. patent application Ser. No. 13/728,413, filed on Dec. 27, 2012, each of which is hereby incorporated by reference herein in its entirety.

TECHNICAL FIELD

The present invention relates to an optical ferrule and an optical connector provided with an adhesive filling recess for fixing an optical fiber.

BACKGROUND ART

Conventionally, an optical ferrule for holding and fixing an optical fiber is known. An exemplary conventional optical ferrule will be explained with reference to FIGS. 11 and 12. FIG. 11 shows a plan view illustrating an optical connector provided with the exemplary conventional optical ferrule. FIG. 12 shows a sectional view (sectional view taken along YY shown in FIG. 11) illustrating the optical connector provided with the exemplary conventional optical ferrule.

The optical ferrule 510, which constitutes the optical connector 500, is provided with an insertion hole 511 into which a coated optical fiber 521 is inserted from the back end side thereof, an optical fiber hole 512 for positioning a bare fiber 520 that is exposed from a forward end of the coated portion of the optical fiber 521, and a first adhesive filling recess 513 and a second adhesive filling recess 514 which are to be filled with an adhesive in order to fix the bare fiber 520 and the vicinity of the forward end of the coated portion of the optical fiber 521. The first adhesive filling recess 513 and the second adhesive filling recess 514 are filled with the liquid adhesive respectively in such a state that the bare fiber 520 is positioned by the optical fiber hole 512. After that, the adhesive 531, 532 is cured, for example, by means of the UV irradiation to thereby fix the bare fiber 520 and the vicinity of the forward end of the coated portion of the optical fiber 521.

When the adhesive is filled into the first adhesive filling recess 513 and the second adhesive filling recess 514, the liquid adhesive is dripped while aiming at a center of an opening of each of the recesses from above by using a dropper or a dispenser.

PRECEDING TECHNICAL DOCUMENTS

Patent Documents

Patent Document 1: JP2009-258510A;
Patent Document 2: JP2005-172990A.

SUMMARY OF THE INVENTION

Problems to be Solved by the Invention

When the optical ferrule is relatively large, the opening of the adhesive filling recess can be made to be relatively large as well. Therefore, it is easy to accurately drip the adhesive into the adhesive filling recess. In the case of a MT connector, the dimensional shape of the optical ferrule as viewed from above is, for example, a rectangle having a length of 8.0 mm and a width of 6.4 mm. The opening of the adhesive filling recess has a rectangular shape having a length of 2 mm and a width of 3 mm. In this case, it is possible to accurately drip the adhesive into the adhesive filling recess.

On the contrary, when the optical ferrule is small-sized, the size of the opening of the adhesive filling recess cannot be expanded. For example, the dimensional shape of the opening should be a slender rectangle in which the length in the lateral direction is about 0.75 mm to 1.0 mm. In this case, it is difficult to accurately drip the adhesive into the adhesive filling recess, sometimes causing the adhesive to adhere to the surface of the optical ferrule and bulge. FIG. 12 shows such a situation that the adhesive 533, 534 adhere to the surface of the optical ferrule 510 and bulge in between the first adhesive filling recess 513 and the second adhesive filling recess 514, and on the back end side from the second adhesive filling recess 514.

In this situation, it is necessary that the adhesive 533, 534 should be wiped off before being cured. Therefore, an adhesive wiping operation is needed in the process of assembling the optical connector 500, thereby increasing labor and consequently resulting in an increase of production cost.

An object of the present invention is to provide an optical ferrule and an optical connector which make it possible to reduce the labor required for the adhesive wiping operation even when the optical ferrule is small-sized.

Means for Solving the Problems

The present invention employs the following means in order to solve the problems as described above.

That is, the optical ferrule of the present invention resides in an optical ferrule comprising:

a positioning structure which positions an optical fiber in a longitudinal direction and in a perpendicular direction thereof, the optical fiber being inserted from an inlet disposed on a back end side of the optical ferrule; and a first adhesive filling recess which is formed at an outlet of the positioning structure so that a forward end of the optical fiber, which is inserted into the positioning structure, protrudes from the outlet to abut against an inner wall of the first adhesive filling recess opposed to the outlet, and the optical fiber is adhesively fixed in a resultant state by means of an adhesive with which the recess is filled, wherein:

the first adhesive filling recess is provided with adhesive accommodating recesses which are provided only at side edge portions disposed on both sides of the first adhesive filling recess in the longitudinal direction of the optical fiber, the adhesive accommodating recesses include a first adhesive accommodating recess and a second adhesive accommodating recess, the first adhesive accommodating recess and the second adhesive accommodating recess being shallower than the first adhesive filling recess, the first adhesive accommodating recess is disposed at a front of the first adhesive filling recess and disposed continuously with the first adhesive filling recess, the second adhesive accommodating recess is disposed at a rear of the first adhesive filling recess and disposed continuously with the first adhesive filling recess.

According to the present invention, even if the adhesive overflows to the side edge portions of the first adhesive filling recess disposed on the both sides in the longitudinal direction of the optical fiber when the adhesive is dripped into the first adhesive filling recess, bulging of the adhesive can be inhibited because the first adhesive accommodating recess and the second adhesive accommodating recess, which can accommodate the overflowing adhesive, are provided at the side edge portions. Therefore, it is possible to reduce the adhesive wiping operation.

It is preferable that the optical ferrule further comprises a mirror for changing an optical path, wherein the mirror is provided on an axis of the optical fiber positioned by the positioning structure.

In this way, the invention can be also applied to the optical ferrule which has the function to change the optical path by means of the mirror.

It is preferable that the optical ferrule further comprises a lens that is provided on an axis of the optical fiber positioned by the positioning structure.

In this way, the invention can be also applied to the optical ferrule which has a lens that is provided on an axis of the optical fiber.

It is preferable that the optical fiber has a coated portion and a bare fiber is exposed from a forward end of the coated portion, the optical ferrule further comprising:

an insertion hole into which the optical fiber is inserted from the back end side; and a second adhesive filling recess which is provided between the insertion hole and the inlet of the positioning structure so as to communicate with both, and in which the forward end of the coated portion of the inserted optical fiber is adhesively fixed by means of the adhesive with which the second adhesive filling recess is filled, wherein:

the second adhesive filling recess is also provided with adhesive accommodating recesses which are provided only at side edge portions disposed on both sides in the longitudinal direction of the optical fiber, the adhesive accommodating recesses of the second adhesive filling recess include a third adhesive accommodating recess and a fourth adhesive accommodating recess, the third adhesive accommodating recess and the fourth adhesive accommodating recess being shallower than the second adhesive filling recess, the third adhesive accommodating recess is disposed at a front of the second adhesive filling recess and disposed continuously with the second adhesive filling recess, the fourth adhesive accommodating recess is disposed at a rear of the second adhesive filling recess and disposed continuously with the second adhesive filling recess, and the second adhesive accommodating recess and the third adhesive accommodating recess are mutually connected between the first adhesive filling recess and the second adhesive filling recess.

Accordingly, it is possible to simplify the structure of the optical ferrule. In accordance therewith, it is also possible to simplify a mold for molding the optical ferrule.

In another aspect, the optical connector of the present invention resides in an optical connector comprising:

an optical fiber;

a positioning structure which positions the optical fiber in a longitudinal direction and in a perpendicular direction thereof, the optical fiber being inserted from an inlet disposed on a back end side of the optical connector; and a first adhesive filling recess which is formed at an outlet of the positioning structure so that a forward end of the optical fiber, which is inserted into the positioning structure, protrudes from the outlet to abut against an inner wall of the first adhesive filling recess opposed to the outlet, and the optical fiber is adhesively fixed in a resultant state by means of an adhesive with which the recess is filled, wherein:

the first adhesive filling recess is provided with adhesive accommodating recesses which are provided only at side edge portions disposed on both sides of the first adhesive filling recess in the longitudinal direction of the optical fiber, the adhesive accommodating recesses include a first adhesive accommodating recess and a second adhesive accommodating recess, the first adhesive accommodating recess and the second adhesive accommodating recess being shallower than the first adhesive filling recess, the first adhesive accommodating recess is disposed at a front of the first adhesive filling recess and disposed continuously with the first adhesive filling recess, the second adhesive accommodating recess is disposed at a rear of the first adhesive filling recess and disposed continuously with the first adhesive filling recess.

The respective constructions as described above can be employed by combining them as far as possible.

Effect of the Invention

As explained above, according to the present invention, even when the optical ferrule is small-sized, it is possible to reduce the labor required for the adhesive wiping operation.

MODE FOR CARRYING OUT THE INVENTION

An embodiment for carrying out the present invention will be explained in detail below with reference to the drawings by way of example. However, the size (dimension), the material, the shape, the relative arrangement, etc. of any constitutive part or component described in the embodiment are not intended to limit the scope of the present invention only thereto, unless otherwise specifically noted. In the following explanation, it is assumed in relation to the direction of the optical ferrule that the forward end side of the optical fiber to be fixed to the optical ferrule is referred to as the forward end side (for example, the left side as viewed in FIG. 1B), the side opposite thereto is referred to as the back end side, and the direction, which is directed vertically upward when the adhesive is filled, is referred to as the upward (for example, the upward direction as viewed in FIG. 4).

First Embodiment

Figure 1A:
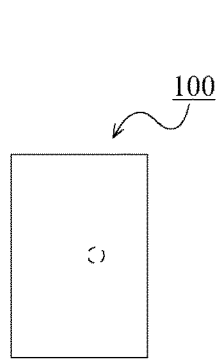
FIG. 1A shows an appearance of an optical connector according to a first embodiment of the present invention.
Figure 1B:
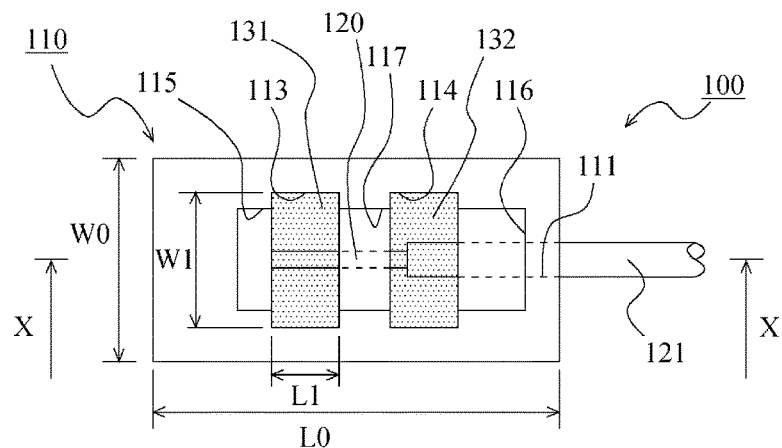
FIG. 1B shows an appearance of an optical connector according to a first embodiment of the present invention.
Figure 2:
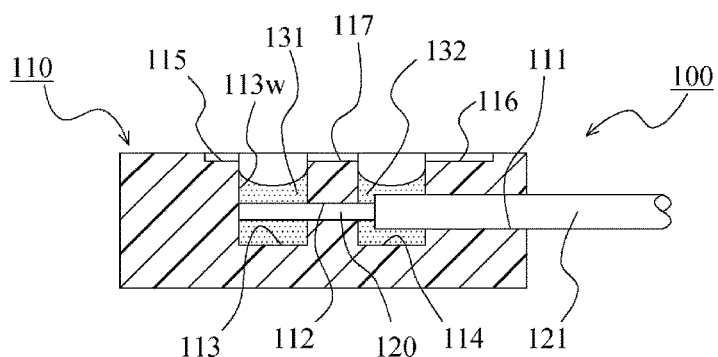
FIG. 2 shows a sectional view illustrating the optical connector according to the first embodiment of the present invention.

An explanation will be made with reference to FIGS. 1A to 5 regarding an optical ferrule according to a first embodiment of the present invention and an optical connector provided with the same.
<Overall Construction of Optical Connector>
An explanation will be made especially with reference to FIGS. 1A, 1B and 2 regarding an overall construction of an optical connector 100 according to an embodiment of the present invention. FIG. 1A and 1B show appearances of the optical connector 100 according to the first embodiment of the present invention. FIG. 1A shows a view as viewed from the forward end side and FIG. 1B shows a plan view. FIG. 2 shows a sectional view taken along XX shown in FIG. 1B.

Figure 3A:
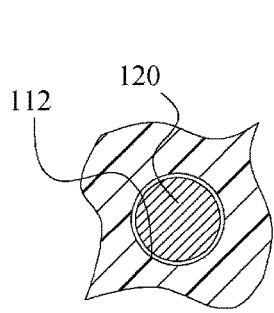
FIG. 3A shows a partial sectional view illustrating optical connectors according to the first embodiment of the present invention.
Figure 3B:
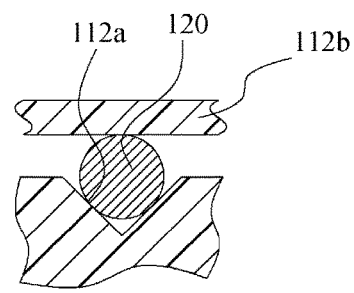
FIG. 3B shows a partial sectional view illustrating optical connectors according to the first embodiment of the present invention.

The optical connector 100 is constructed such that an optical ferrule (optical connector optical ferrule) 110 is attached to a forward end of a coated optical fiber 121. The coating is removed from the forward end side of the optical fiber 121, thus a bare fiber 120 is exposed from the forward end of the coated portion of the optical fiber 121. It is desirable that the forward end surface of the bare fiber 120 is a vertical surface with respect to the direction in which the bare fiber 120 extends. The example shown in the drawing is illustrative of a case where the optical fiber is an optical fiber strand. However, there is no limitation thereto. It is also possible to apply an optical fiber core or an optical fiber cord. Further, the material of the bare fiber 120 is not limited as well. It is possible to adopt, for example, those based on silica or those based on plastic such as acrylic resin or the like. Further, the transmission mode of the bare fiber 120 is not limited as well. It is possible to adopt any one of the single-mode and the multi-mode.
<Optical Ferrule>
An explanation will be made in detail regarding the optical ferrule 110 especially with reference to FIGS. 1 to 3B. FIG. 3A and 3B show partially sectional views each of which illustrates the positioning structure portion for the bare fiber (sectional views taken in the direction perpendicular to the extending direction of the bare fiber).

The optical ferrule 110 is attached to the forward end of the optical fiber 121 and is provided to optically connect with other optical part. Further, the optical ferrule 110 plays the role to position the optical fiber 121 and the bare fiber 120 in the optical connector 100. The optical ferrule 110 according to this embodiment is composed of a transparent resin material including: polycarbonate, modified polyolefin, epoxy-based resin, polyether imide and the like. When the resin material as described above is used, the optical ferrule 110 can be molded by means of the injection molding. As for the material for constructing the optical ferrule 110, it is necessary that the portion, which serves as the optical path, should be transparent with respect to the wavelength of the light to be used (ultraviolet light or infrared light may be used in addition to visible light), while the other portions do not have to be transparent with respect to the concerning wavelength.

The optical ferrule 110 is provided with an insertion hole 111 into which the optical fiber 121 is inserted from the back end side thereof, an optical fiber hole 112 which is provided to position the bare fiber 120 in a longitudinal direction and in a perpendicular direction of the optical fiber, and a first adhesive filling recess 113 and a second adhesive filling recess 114 which are to be filled with the adhesive in order to fix the bare fiber 120 and the vicinity of the forward end of the coated portion of the optical fiber 121.

The insertion hole 111 is provided to penetrate from the back end side of the optical ferrule 110 into the second adhesive filling recess 114. The inner diameter of the insertion hole 111 is set to be substantially the same as the outer diameter of the optical fiber 121. Further, the optical fiber hole 112 is provided to penetrate from the first adhesive filling recess 113 into the second adhesive filling recess 114. The inner diameter of the optical fiber hole 112 is set to be substantially the same as the outer diameter of the bare fiber 120. In addition, the center line of the optical fiber hole 112 is coincident with the center line of the insertion hole 111.

The first adhesive filling recess 113 is formed at the outlet of the optical fiber hole 112. The second adhesive filling recess 114 is provided between the insertion hole 111 (or the outlet thereof) and the optical fiber hole 112 (or the inlet thereof).

The embodiment of the present invention is illustrative of such a case that the optical fiber hole 112, which is adopted as the positioning structure for the bare fiber 120, is constructed by the through-hole having a circular cross section (see FIG. 3A). However, the positioning structure is not limited thereto. For example, it is possible to adopt a V-shaped groove 112*a* having a V-shaped cross section, as shown in FIG. 3B, as well as, although not specifically shown, a U-shaped groove having a U-shaped cross section, or any other appropriate technique. In case the V-shaped groove 112*a* is adopted, as shown in FIG. 3B, it is necessary that a cover 112*b*, which is composed of, for example, a flat plate-shaped member or the like, should be provided thereon. As described above, when the bare fiber 120 is inserted into the optical fiber hole 112 or the optical fiber groove (V-shaped groove or U-shaped groove), it is possible to thereby position the bare fiber 120 in the longitudinal direction and in the perpendicular direction of the optical fiber. The point that not only the optical fiber hole but also the optical fiber groove can be adopted as the positioning structure applies equally to other embodiments described later on.

The optical fiber 121 and the bare fiber 120 disposed at the forward end thereof are inserted from the back end side of the optical ferrule 110 through the insertion hole 111 and the optical fiber hole 112, in this order, until the position where they abut against the inner wall 113*w* of the first adhesive filling recess 113 (inner wall 113*w* of the first adhesive filling recess 113 opposed to the outlet of the optical fiber hole 112). As described above, the center lines of the insertion hole 111 and the optical fiber hole 112 are coincident with each other. Further, the air or the like, which exists inside of the insertion hole 111 and the optical fiber hole 112 is discharged to the second adhesive filling recess 114 and the first adhesive filling recess 113 respectively during the process of insertion of the optical fiber 121 and the bare fiber 120 disposed at the forward end thereof. Therefore, it is possible to smoothly insert the optical fiber 121 and the bare fiber 120 disposed at the forward end thereof.

Then, when the forward end surface of the bare fiber 120 abuts against the inner wall 113w of the first adhesive filling recess 113, and is in a state that it is being positioned by the optical fiber hole 112, each of the first adhesive filling recess 113 and the second adhesive filling recess 114 is filled with the liquid adhesive. After that, the optical fiber 121 and the bare fiber 120 disposed at the forward end thereof are fixed by the adhesive 131, 132 cured in the first adhesive filling recess 113 and the second adhesive filling recess 114. The bare fiber 120 is fixed in the first adhesive filling recess 113. The vicinity of the forward end of the coated portion of the optical fiber 121, that passes through the second adhesive filling recess 114, is fixed in the second adhesive filling recess 114.

The adhesive may be permeated into the optical fiber hole 112. In this case, the bare fiber 120 can be also fixed in the optical fiber hole 112. A light-transmissive adhesive is preferred as the adhesive. In particular, it is preferable that the refractive index thereof is equivalent to the refractive index of the core of the bare fiber 120. Further, it is desirable that the adhesive has such a property that a high adhering force can be realized for each of the optical ferrule 110, the coating of the optical fiber 121 and the bare fiber 120. Specified examples of the adhesive can be exemplified by epoxy-based thermosetting adhesives and acrylic-based adhesives, as well as ultraviolet-curable adhesives.

It is desirable to make such a contrivance that the adhesive is filled while pressing the optical fiber 121 so that the forward end surface of the bare fiber 120 is fixed while abutting against the inner wall 113w of the first adhesive filling recess 113. However, as long as the forward end surface of the bare fiber 120 is substantially parallel to the inner wall 113w of the first adhesive filling recess 113, it is also allowable to provide a gap therebetween. That is, even when the gap exists, the adhesive, which is filled and cured in the gap, exhibits the function as a refractive index matching agent. Therefore, it is possible to inhibit the optical loss.

<Filling of Adhesive>

Figure 4:
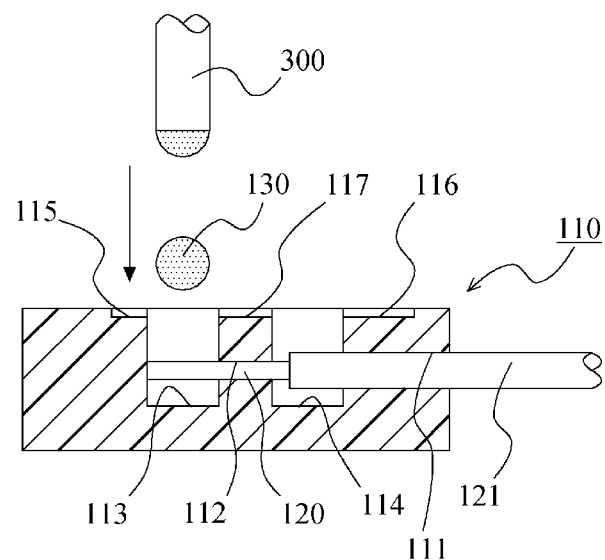
FIG. 4 shows a situation provided when an optical ferrule according to the first embodiment of the present invention is filled with an adhesive.
Figure 5:
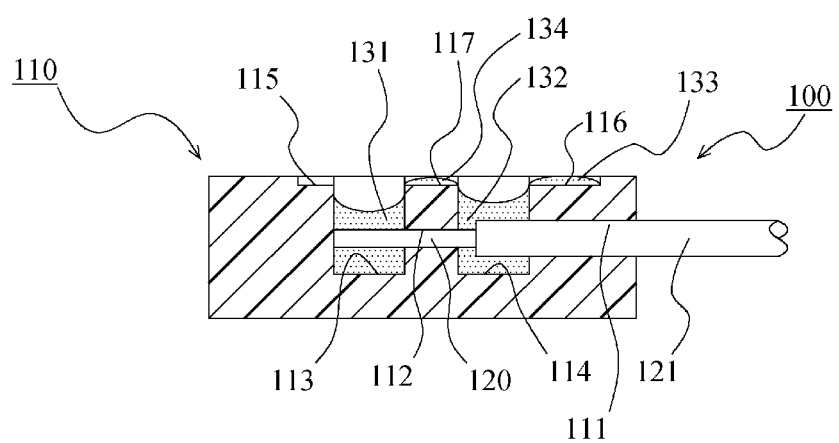
FIG. 5 shows a situation provided after the optical ferrule according to the first embodiment of the present invention is filled with the adhesive.

An explanation will be made in further detail regarding the construction of the optical ferrule 110 in relation to the filling of the adhesive especially with reference to FIGS. 1, 4, and 5. FIG. 4 shows a situation in which the optical ferrule 110 is being filled with the adhesive. As for the optical ferrule 110, the sectional view taken along XX shown in FIG. 1B is used. Further, FIG. 5 shows a situation provided after the optical ferrule 110 is filled with the adhesive. As for the optical ferrule 110, the sectional view taken along XX shown in FIG. 1B is used.

The optical ferrule 110 according to this embodiment is small-sized, thus the size of each of the openings of the first adhesive filling recess 113 and the second adhesive filling recess 114 cannot be expanded. That is, the optical ferrule 110 according to this embodiment is generally a rectangular parallelepiped. The dimensional shape of the optical ferrule 110 as viewed from above is, for example, a rectangle having a length L0 of 6.0 mm and a width W0 of 3.0 mm (see FIG. 1B). Therefore, as clarified from FIG. 1B, each of the openings of the first adhesive filling recess 113 and the second adhesive filling recess 114 has a rectangular shape which extends in a slender form in the widthwise direction of the optical ferrule. The opening is, for example, a rectangle having a length L1 of equal to or more than 0.75 mm and equal to or less than 1.00 mm and a width W1 of equal to or more than 0.75 mm and equal to or less than 2.50 mm.

In this embodiment, the first adhesive filling recess 113 and the second adhesive filling recess 114 are constructed to have the same dimensional shape.

When the first adhesive filling recess 113 and the second adhesive filling recess 114 are being filled with the adhesive, as shown in FIG. 4, the liquid adhesive 130 is dripped while aiming at the center of the opening from above by using a dispenser 300 (or dropper and the like). That is, the adhesive 130 is dripped through each of the openings of the first adhesive filling recess 113 and the second adhesive filling recess 114.

However, as described above, the opening has the rectangular shape which extends in the slender form. The distance in the lateral direction thereof (i.e., the length L1) is approximately the same as the diameter of the dripped adhesive 130 having a substantially spherical shape (ball-shaped form). Therefore, it is difficult to accurately drip the adhesive into the first adhesive filling recess 113 and the second adhesive filling recess 114. That is, the adhesive adheres to the vicinity of the side edge portions on the both sides in the lateral direction (longitudinal direction of the optical fiber) of the rectangular-shaped openings.

In view of the above, the optical ferrule 110 according to this embodiment is provided with adhesive accommodating recesses which are capable of accommodating the overflowing adhesive and are provided only at the side edge portions disposed on the both sides in the lateral direction of each of the openings (both sides in the longitudinal direction of the optical fiber) of the first adhesive filling recess 113 and the second adhesive filling recess 114 respectively. In the following description, the adhesive accommodating recesses are appropriately referred to as follows for the convenience of explanation. That is, an adhesive accommodating recess, which is provided at the side edge portion disposed on the forward end side of the first adhesive filling recess 113, (i.e., an adhesive accommodating recess provided at a front of the first adhesive filling recess 113) is referred to as "first adhesive accommodating recess 115". An adhesive accommodating recess, which is provided at the side edge portion disposed on the back end side of the second adhesive filling recess 114, (i.e., an adhesive accommodating recess provided at a rear of the second adhesive filling recess 114) is referred to as "second adhesive accommodating recess 116". The adhesive accommodating recess, which is provided between the first adhesive filling recess 113 and the second adhesive filling recess 114, is referred to as "third adhesive accommodating recess 117". The third adhesive accommodating recess 117 serves as both of an adhesive accommodating recess which is provided at the side edge portion in the lateral direction of the first adhesive filling recess 113 (i.e., an adhesive accommodating recess provided at a rear of the first adhesive filling recess 113) and an adhesive accommodating recess which is provided at the side edge portion in the lateral direction of the second adhesive filling recess 114 (i.e., an adhesive accommodating recess provided at a front of the second adhesive filling recess 114). In other words, the adhesive accommodating recess provided at the rear of the first adhesive filling recess 113 and the adhesive accommodating recess provided at the front of the second adhesive filling recess 114 are mutually connected between the neighboring adhesive filling recesses, i.e. the first adhesive filling recess 113 and the second adhesive filling recess 114.

The first adhesive accommodating recess 115, the second adhesive accommodating recess 116, and the third adhesive accommodating recess 117 are formed in the areas to which the adhesive 130 tends to overflow when the liquid adhesive 130 is dripped while aiming at the center of the opening. Each of the adhesive accommodating recesses is constructed by a step having a constant depth of equal to or more than 0.03 mm and equal to or less than 0.30 mm with respect to the upper side surface of the optical ferrule 110. In other words, each of the adhesive accommodating recesses is shallower than the first adhesive filling recess 113 and the second adhesive filling recess 114. Further, it is desirable that the volume of the adhesive accommodating recess (determined by the product of the surface area of the bottom surface and the above described depth) is appropriately set depending on the error of the amount of the liquid adhesive 130 to be dripped. That is, there is not only a case where the dripped liquid adhesive 130 directly adheres to the adhesive accommodating recesses, but also a case where the adhesive overflows upwardly due to the volumes of the first adhesive filling recess 113 and the second adhesive filling recess 114 being small and a difficulty in stabilizing the amount of the dripped adhesive 130. In view of the above, it is desirable that the volumes of the adhesive accommodating recesses are set depending on the error of the amount of the adhesive 130 so that the adhesive is not bulged from the upper side surface of the optical ferrule 110 even when the adhesive overflows upwardly from the adhesive filling recesses.

FIG. 5 shows such a situation, as one example, that the adhesive 133, 134 overflow to the second adhesive accommodating recess 116 and the third adhesive accommodating recess 117 in the process of filling the liquid adhesive 130.

<Superior Features of Optical Ferrule and Optical Connector of this Embodiment>

The optical ferrule 110 according to this embodiment is small-sized. Therefore, the size of each of the openings of the first adhesive filling recess 113 and the second adhesive filling recess 114 cannot be expanded, thus making it difficult to accurately drip the adhesive thereinto. However, in the optical ferrule 110 (and the optical connector 100 provided with the same) of this embodiment, even if the adhesive overflows to the side edge portions in the lateral direction of the rectangular-shaped opening, when the adhesive 130 is dripped through the opening, bulging of the adhesive can be inhibited because it is provided with the adhesive accommodating recesses, disposed at the side edge portions, which are capable of accommodating the overflowing adhesive (see FIG. 5). Therefore, it is possible to reduce the adhesive wiping operation. In accordance therewith, it is also possible to decrease the production cost.

Further, this embodiment adopts the construction such that the two adhesive accommodating recesses provided between the neighboring adhesive filling recesses, i.e. first adhesive filling recess 113 and the second adhesive filling recess 114, are mutually connected. Therefore, it is possible to simplify the structure of the optical ferrule 110 in comparison with such a case that an adhesive accommodating recess provided at the rear of the first adhesive filling recess 113 is separated from an adhesive accommodating recess provided at the front of the second adhesive filling recess 114. Therefore, it is possible to simplify the mold for molding the optical ferrule 110. In accordance therewith, it is possible to inhibit the increase in the production cost.

Second Embodiment

Figure 6:
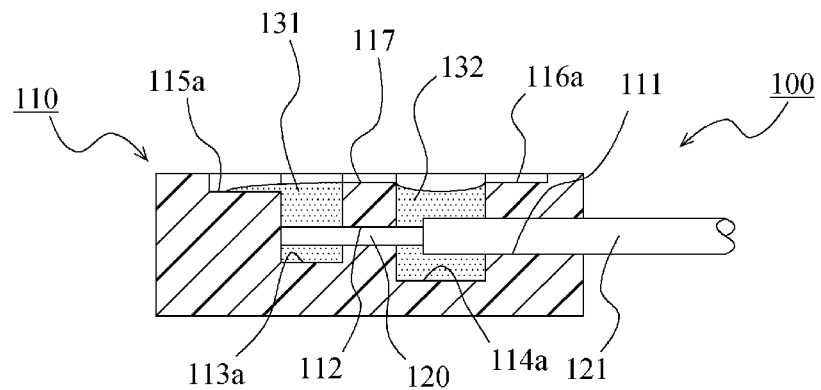
FIG. 6 shows a sectional view illustrating an optical connector according to a second embodiment of the present invention.

FIG. 6 shows a second embodiment of the present invention. The first embodiment described above is illustrative of such a case that the dimensional shapes of the first and the second adhesive filling recesses are constructed to be identical. However, this embodiment is illustrative of a construction provided when the dimensional shapes are different from each other. Other part of the construction and the function are the same as those of the first embodiment. Therefore, the same constitutive parts or components are designated by the same reference numerals, any explanation of which will be omitted.

FIG. 6 shows a sectional view illustrating an optical connector 100 according to the second embodiment of the present invention, which corresponds to the cross section taken along XX shown in FIG. 1B. An optical ferrule 110 according to this embodiment is also provided with a first adhesive filling recess 113a and a second adhesive filling recess 114a as well as a first adhesive accommodating recess 115a, a second adhesive accommodating recess 116a, and a third adhesive accommodating recess 117 which are provided only at side edge portions on the both sides in the lateral direction of each of openings thereof (both sides in the longitudinal direction of the optical fiber), in the same manner as in the first embodiment described above.

In the case of this embodiment, unlike the first embodiment described above, the dimensional shape of the first adhesive filling recess 113a is smaller than the dimensional shape of the second adhesive filling recess 114a, thus its volume is decreased.

As explained in the first embodiment, it is difficult to stabilize the amount of the adhesive to be dripped. Therefore, the adhesive sometimes overflows upwardly from the adhesive filling recess. Usually, the smaller the volume of the adhesive filling recess is, the more easily the adhesive overflows.

In view of the above, in this embodiment, the first adhesive accommodating recess 115a, which is provided on the forward end side of the first adhesive filling recess 113a with a small volume, has the dimensional shape which is made larger than that of the second adhesive accommodating recess 116a, which is provided on the back end side of the second adhesive filling recess 114a, so that its volume is more increased. Accordingly, even when the adhesive overflows upwardly from the adhesive filling recess, it is possible to appropriately inhibit the adhesive from being bulged as compared with the surface of the optical ferrule 110 disposed on the upper side.

Third Embodiment

Figure 7:
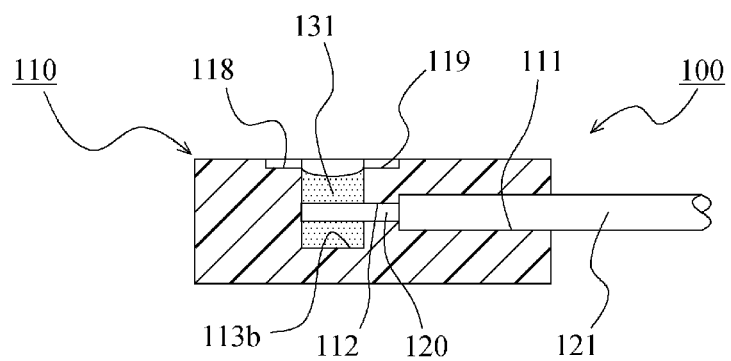
FIG. 7 shows a sectional view illustrating an optical connector according to a third embodiment of the present invention.

FIG. 7 shows a third embodiment of the present invention. The first and second embodiments described above are illustrative of such a case that the adhesive filling recesses are provided at the two positions. However, this embodiment is illustrative of a construction provided when the adhesive filling recess is provided at only one position. Other part of the construction and the function are the same as those of the first embodiment. Therefore, the same constitutive parts or components are designated by the same reference numerals, any explanation of which will be omitted.

FIG. 7 shows a sectional view illustrating an optical connector 100 according to the third embodiment of the present invention, which corresponds to the cross section taken along XX shown in FIG. 1B. In the case of an optical ferrule 110 according to this embodiment, unlike the case of the first embodiment described above, an adhesive filling recess 113b is provided at only one position disposed on the forward end side of the optical fiber hole 112. Adhesive accommodating recesses 118, 119, which are capable of accommodating the overflowing adhesive, are provided respectively only at side edge portions disposed on the both sides in the lateral direction of the opening of the adhesive filling recess 113b (both sides in the longitudinal direction of the optical fiber).

According to the construction as described above, it goes without saying that the effect, which is equivalent to that of the first embodiment described above, is also obtained for the optical ferrule 110 according to this embodiment (and the optical connector 100 provided with the same).

Fourth Embodiment

Figure 8:
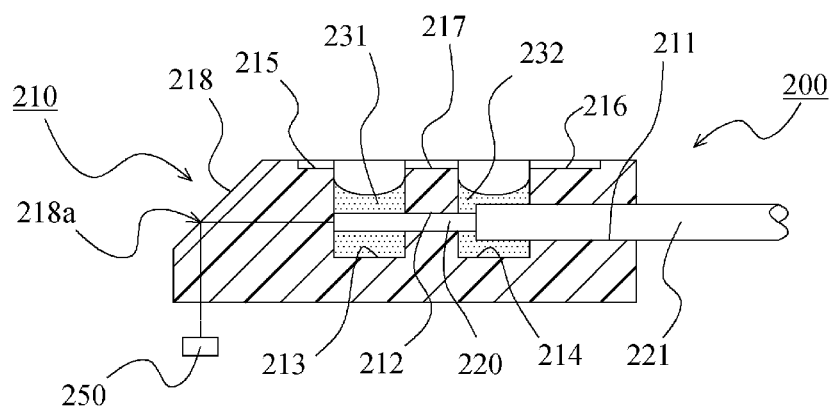
FIG. 8 shows a sectional view illustrating an optical path changing connector according to a fourth embodiment of the present invention.

FIG. 8 shows a fourth embodiment of the present invention. This embodiment is illustrative of such a case that the construction, which is provided to inhibit the adhesive from being bulged, is applied to an optical path changing connector. That is, this embodiment is illustrative of a construction provided when a mirror for reflecting the light is provided for the optical ferrule. Other basic part of the construction and the function are the same as those of the respective embodiments described above. Therefore, any explanation thereof will be appropriately omitted. FIG. 8 shows a sectional view illustrating an optical path changing connector 200 according to the fourth embodiment of the present invention, which corresponds to the cross section taken along XX shown in FIG. 1B.

The optical path changing connector 200 according to this embodiment is also provided with an optical ferrule 210 and an optical fiber 221 in the same manner as in the first embodiment. The coating is removed from the forward end side of the optical fiber 221 according to this embodiment, and a bare fiber 220 is exposed from the forward end of the coated portion of the optical fiber 221. Further, the optical ferrule 210 according to this embodiment is also provided with an insertion hole 211, an optical fiber hole 212, a first adhesive filling recess 213, a second adhesive filling recess 214, a first adhesive accommodating recess 215, a second adhesive accommodating recess 216, and a third adhesive accommodating recess 217 in the same manner as in the first embodiment described above. The construction and the function thereof are equivalent to those of the first embodiment described above.

In the case of the optical ferrule 210 according to this embodiment, unlike the first embodiment described above, an inclined surface 218 is provided between the forward end surface and the upper surface thereof. Owing to the inclined surface 218 provided as described above, the light, which passes through the interior of the optical ferrule 210, can be reflected by the inner surface of the inclined surface 218 on the basis of the difference in the refractive index between the optical ferrule 210 and the external medium (usually the air). That is, a mirror 218a for reflecting the light can be formed on the inclined surface 218. Accordingly, the light, which comes out from the forward end of the positioned and fixed optical fiber 221 (bare fiber 220), can be reflected by the mirror 218a to go into an optical part 250 which is disposed outside the optical ferrule 210. In this case, the optical part 250 can be exemplified by a light-receiving element such as a photodiode or the like. Further, the light, which comes out from an optical part 250 disposed outside the optical ferrule, can be reflected by the mirror 218a to go into the optical fiber 221 (bare fiber 220) as well. In this case, the optical part 250 can be exemplified by a light-emitting element such as a semiconductor laser or the like.

As described above, the construction, which is provided to inhibit the adhesive from being bulged as explained in the first embodiment, can be also applied to the optical path changing connector. It goes without saying that the effect, which is equivalent to that of the first embodiment, is also obtained by the optical ferrule 210 according to this embodiment (and the optical path changing connector 200 provided with the same).

Fifth Embodiment

Figure 9:
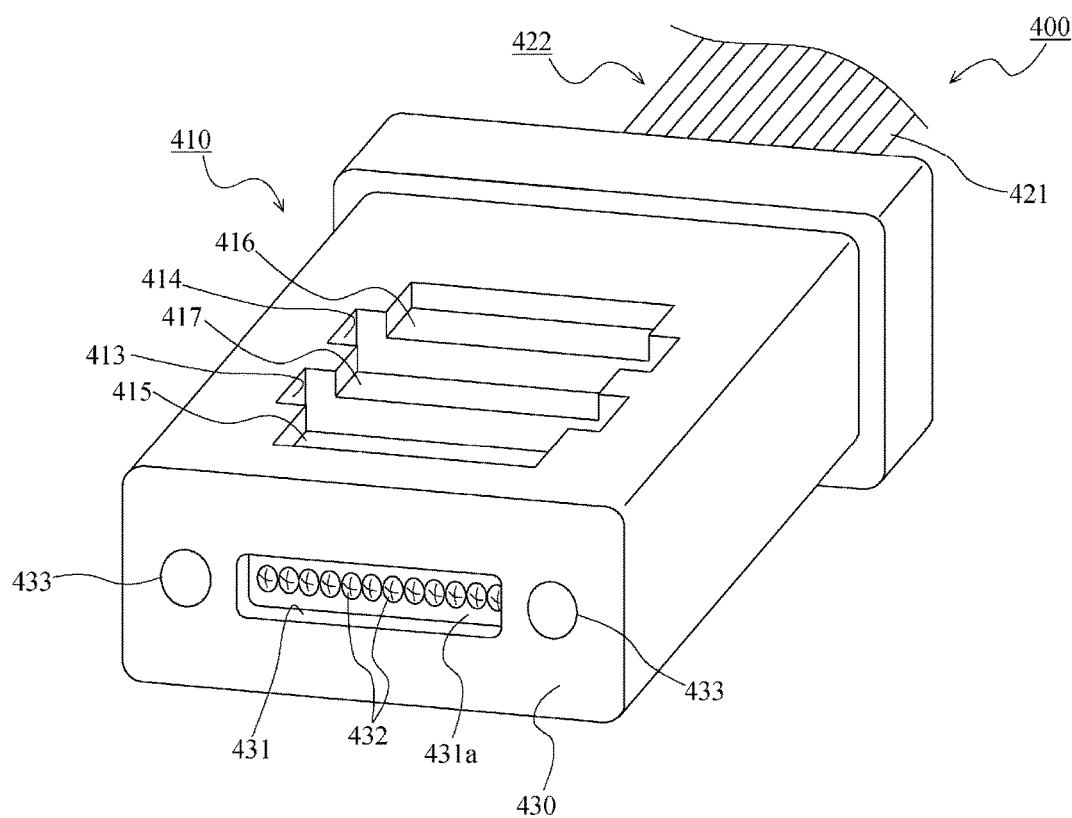
FIG. 9 shows a front perspective view illustrating an optical connector with lenses according to a fifth embodiment of the present invention.
Figure 10:
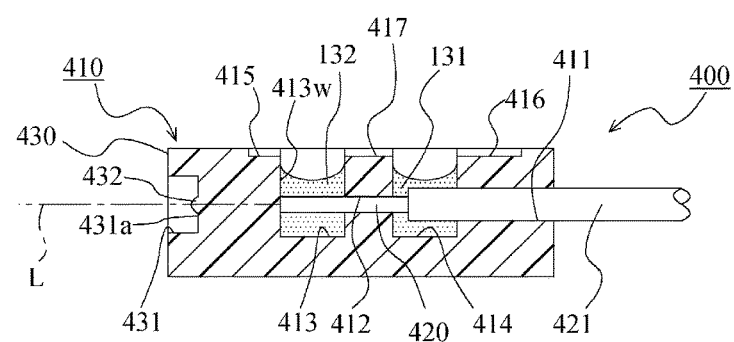
FIG. 10 shows a sectional view illustrating the optical connector with lenses according to the fifth embodiment of the present invention.
Figure 11:
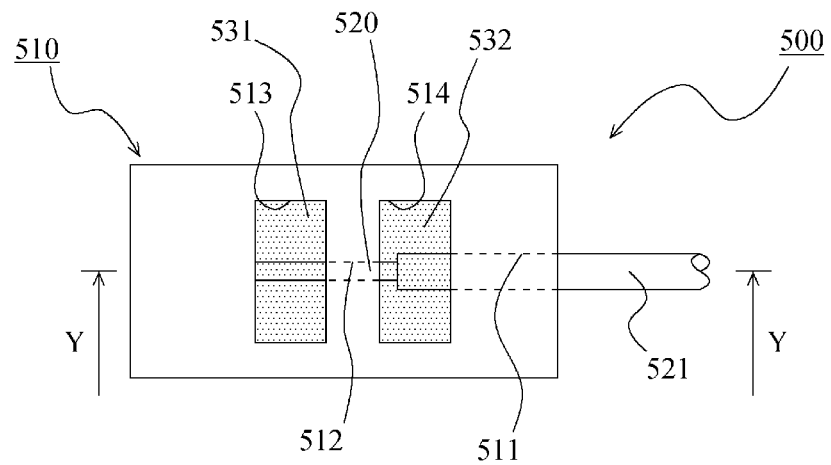
FIG. 11 shows a plan view illustrating an exemplary conventional optical connector.
Figure 12:
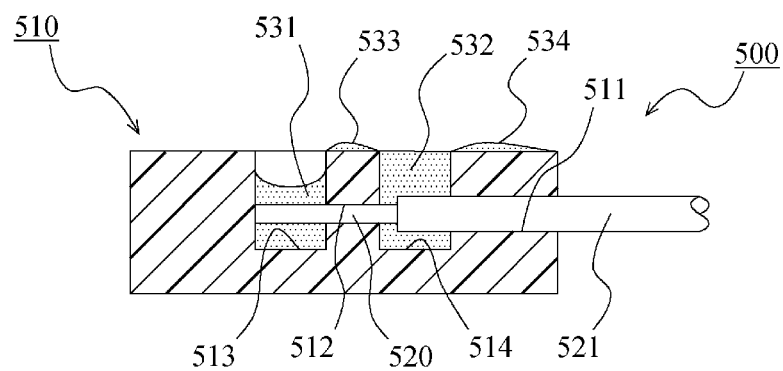
FIG. 12 shows a sectional view illustrating the exemplary conventional optical connector.

FIGS. 9 and 10 show a fifth embodiment of the present invention. This embodiment is illustrative of such a case that the construction, which is provided to inhibit the adhesive from being bulged, is applied to an optical connector with lenses. That is, this embodiment is illustrative of a construction provided when lenses are provided for the optical ferrule. Other basic part of the construction and the function are the same as those of the respective embodiments described above. Therefore, any explanation thereof will be appropriately omitted. FIG. 9 shows a front perspective view illustrating an optical connector 400 with lenses according to the fifth embodiment of the present invention. FIG. 10 shows a sectional view illustrating the optical connector 400 according to the fifth embodiment of the present invention, which corresponds to the cross section taken along XX shown in FIG. 1B.

The optical connector 400 with lenses is mainly used for connecting with another optical connector with lenses. The optical connector 400 is constructed such that an optical ferrule 410 is attached to a forward end of a ribbon shaped optical fiber cable 422. The optical fiber cable 422 is composed of twelve coated optical fibers 421. Thus, the optical connector 400 is a connector for a multicore cable. The coating is removed from the forward end side of each of the optical fibers 421, thus a bare fiber 420 is exposed from the forward end of the coated portion of each of the optical fibers 421. The optical ferrule 410 according to this embodiment is provided with an insertion hole 411 into which the optical fiber cable 422 is inserted from the back end side thereof, and an optical fiber hole 412 which is provided to position the bare fiber 420 in a longitudinal direction and in a perpendicular direction of the optical fiber. Because one optical fiber hole 412 is provided for each of the bare fibers 420, twelve optical fiber holes 412 are provided in this embodiment. The optical ferrule 410 is also provided with a first adhesive filling recess 413, a second adhesive filling recess 414, a first adhesive accommodating recess 415, a second adhesive accommodating recess 416, and a third adhesive accommodating recess 417 in the same manner as in the first embodiment described above. The construction and the function thereof are equivalent to those of the first embodiment described above. Further, guide pin holes 433 are provided on a front end face 430 of the optical ferrule 410. When connecting the optical connector 400 with another optical connector, guide pins (not shown) may be inserted into the guide pin holes 433 to align the optical ferrule 410 with that of the other optical connector.

In the case of the optical ferrule 410 according to this embodiment, unlike the first embodiment described above, a recessed portion 431 is formed on the front end face 430. In addition, a plurality of lenses 432 having a convex shape are provided on a face 431a of the recessed portion 431 that faces the front of the optical ferrule 410. The lenses 432 are integrated (integrally formed) with the optical ferrule 410 so that they compose a part of the optical ferrule 410. Because one lens 432 is provided for each of the bare fibers 420, twelve lenses 432 are provided in this embodiment. The plurality of lenses 432 are enclosed in the recessed portion 431 so that they do not protrude from the front end face 430. Each of the plurality of lenses 432 is positioned on an axis L of the corresponding optical fiber 421 (bare fiber 420) that is positioned by the corresponding optical fiber hole 412. Thus, the plurality of lenses 432 are precisely positioned to be in optical alignment with the plurality of optical fiber holes 412 (and the optical fibers 421 inserted therein).

According to this embodiment, the lens 432 collimates the light exited from the corresponding bare fiber 420 into a near-parallel light beam. In other words, the lens 432 exhibits function as a collimating lens. The lens 432 also focuses the received light exited from the mated optical ferrule onto the front end face of the corresponding bare fiber 420. Thus, the focal point of the lens 432 is preferably set to be on an inner wall 413w onto which the front end faces of the bare fibers 420 abut. Note that the lenses 432 are not limited to those integrated with the optical ferrule 410. A plurality of lenses that are formed separately can be fitted to appropriate locations.

As described above, the construction, which is provided to inhibit the adhesive from being bulged as explained in the first embodiment, can be also applied to the optical connector with lenses. It goes without saying that the effect, which is equivalent to that of the first embodiment, is also obtained by the optical ferrule 410 according to this embodiment (and the optical connector 400 provided with the same).

Other Embodiments

The respective foregoing first and fourth embodiments have been explained as exemplified by the case of the connector or the optical path changing connector having the single core. However, the construction, which is provided to inhibit the adhesive from being bulged, can be also applied to a connector and an optical path changing connector for multiple cores in which a plurality of optical fibers are fixed. On the other hand, the construction in the fifth embodiment, which is provided to inhibit the adhesive from being bulged, can be also applied to an optical connector with lens in which a single optical fiber is fixed.

DESCRIPTION OF THE REFERENCE SYMBOLS

100: optical connector, 110, 210, 410: optical ferrule, 111, 211, 411: insertion hole, 112, 212, 412: optical fiber hole, 113, 113*a*, 213, 413: first adhesive filling recess, 113*w*, 413*w*: inner wall, 114, 114*a*, 214, 414: second adhesive filling recess, 115, 115*a*, 215, 415: first adhesive accommodating recess, 116, 116*a*, 216, 416: second adhesive accommodating recess, 117, 217, 417: third adhesive accommodating recess, 118, 119: adhesive accommodating recess, 120, 220, 420: bare fiber, 121, 221, 421: coated optical fiber, 130, 131, 132, 133, 134: adhesive, 200: optical path changing connector, 218*a*: mirror, 250: optical part, 400: optical connector with lenses, 422: optical fiber cable, 432: lens

The invention claimed is:

1. An optical ferrule assembled at a tip of an optical fiber, the optical ferrule comprising:
   an insertion hole disposed on a back end side of the optical ferrule, the optical fiber being inserted from the insertion hole;
   an optical fiber hole which positions the optical fiber inserted from the insertion hole in a longitudinal direction and in a perpendicular direction of the optical fiber, the optical fiber hole having an inlet for the optical fiber in front of the insertion hole;
   a first adhesive filling recess which is formed at an outlet of the optical fiber hole, the optical fiber protruding from the outlet and abutting against an inner wall of the first adhesive filling recess opposed to the outlet, the first adhesive filling recess being filled with an adhesive so that the optical fiber is adhesively fixed by the adhesive, the first adhesive filling recess being shorter in the longitudinal direction of the optical fiber than in the perpendicular direction of the optical fiber, and the first adhesive filling recess including a front side edge and a rear side edge both extending perpendicular to the longitudinal direction of the optical fiber;
   a first adhesive accommodating recess provided only at and along the front side edge of the first adhesive filling recess, the first adhesive accommodating recess being shallower than the first adhesive filling recess, the first adhesive accommodating recess extending longitudinally in the perpendicular direction of the optical fiber such that the first adhesive accommodating recess has a length in the perpendicular direction of the optical fiber and a width in a longitudinal direction of the optical fiber, the length of the first adhesive accommodating recess being longer than the width of the first adhesive accommodating recess, and the first adhesive accommodating recess being shorter in the length than a size of the first adhesive filling recess in the perpendicular direction of the optical fiber;
   a second adhesive accommodating recess provided only at and along the rear side edge of the first adhesive filling recess, the second adhesive accommodating recess being shallower than the first adhesive filling recess, the second adhesive accommodating recess extending longitudinally in the perpendicular direction of the optical fiber such that the second adhesive accommodating recess has a length in the perpendicular direction of the optical fiber and a width in a longitudinal direction of the optical fiber, the length of the second adhesive accommodating recess being longer than the width of the second adhesive accommodating recess, and the second adhesive accommodating recess being shorter in the length than a size of the first adhesive filling recess in the perpendicular direction of the optical fiber;
   a second adhesive filling recess which is provided between the insertion hole and the inlet of the optical fiber hole so as to communicate with both, the second adhesive filling recess being filled with an adhesive so that the optical fiber is adhesively fixed by the adhesive, the second adhesive filling recess being shorter in the longitudinal direction of the optical fiber than in the perpendicular direction of the optical fiber, and
   the second adhesive filling recess including a front side edge and a rear side edge both extending perpendicular to the longitudinal direction of the optical fiber;
   a third adhesive accommodating recess provided only at and along the front side edge of the second adhesive filling recess, the third adhesive accommodating recess being shallower than the second adhesive filling recess, and the third adhesive accommodating recess being shorter in width, which is a length in the perpendicular direction of the optical fiber, than the second adhesive filling recess; and
   a fourth adhesive accommodating recess provided only at and along the rear side edge of the second adhesive filling recess, the fourth adhesive accommodating recess being shallower than the second adhesive filling recess, and the fourth adhesive accommodating recess being shorter in width, which is a length in the perpendicular direction of the optical fiber, than the second adhesive filling recess, wherein the second adhesive accommodating recess and the third adhesive accommodating recess are mutually connected between the first adhesive filling recess and the second adhesive filling recess.

2. The optical ferrule according to claim 1, further comprising a mirror for changing an optical path, wherein the mirror is provided on an axis of the optical fiber positioned by the optical fiber hole.

3. The optical ferrule according to claim 1, further comprising a lens that is provided on an axis of the optical fiber positioned by the optical fiber hole.

4. An optical connector comprising:
an optical fiber;
an insertion hole disposed on a back end side of the optical connector, the optical fiber being inserted from the insertion hole;
an optical fiber hole which positions the optical fiber inserted from the insertion hole in a longitudinal direction and in a perpendicular direction of the optical fiber, the optical fiber hole having an inlet for the optical fiber in front of the insertion hole;
a first adhesive filling recess which is formed at an outlet of the optical fiber hole, the optical fiber protruding from the outlet and abutting against an inner wall of the first adhesive filling recess opposed to the outlet, the first adhesive filling recess being filled with an adhesive so that the optical fiber is adhesively fixed by the adhesive, the first adhesive filling recess being shorter in the longitudinal direction of the optical fiber than in the perpendicular direction of the optical fiber, and the first adhesive filling recess including a front side edge and a rear side edge both extending perpendicular to the longitudinal direction of the optical fiber;
a first adhesive accommodating recess provided only at and along the front side edge of the first adhesive filling recess, the first adhesive accommodating recess being shallower than the first adhesive filling recess, the first adhesive accommodating recess extending longitudinally in the perpendicular direction of the optical fiber such that the first adhesive accommodating recess has a length in the perpendicular direction of the optical fiber and a width in a longitudinal direction of the optical fiber, the length of the first adhesive accommodating recess being longer than the width of the first adhesive accommodating recess, and the first adhesive accommodating recess being shorter in the length than a size of the first adhesive filling recess in the perpendicular direction of the optical fiber;
a second adhesive accommodating recess provided only at and along the rear side edge of the first adhesive filling recess, the second adhesive accommodating recess being shallower than the first adhesive filling recess, the second adhesive accommodating recess extending longitudinally in the perpendicular direction of the optical fiber such that the second adhesive accommodating recess has a length in the perpendicular direction of the optical fiber and a width in a longitudinal direction of the optical fiber, the length of the second adhesive accommodating recess being longer than the width of the second adhesive accommodating recess, and the second adhesive accommodating recess being shorter in the length than a size of the first adhesive filling recess in the perpendicular direction of the optical fiber;
a second adhesive filling recess which is provided between the insertion hole and the inlet of the optical fiber hole so as to communicate with both, the second adhesive filling recess being filled with an adhesive so that the optical fiber is adhesively fixed by the adhesive, the second adhesive filling recess being shorter in the longitudinal direction of the optical fiber than in the perpendicular direction of the optical fiber, and the second adhesive filling recess including a front side edge and a rear side edge both extending perpendicular to the longitudinal direction of the optical fiber;
a third adhesive accommodating recess provided only at and along the front side edge of the second adhesive filling recess, the third adhesive accommodating recess being shallower than the second adhesive filling recess, and the third adhesive accommodating recess being shorter in width, which is a length in the perpendicular direction of the optical fiber, than the second adhesive filling recess; and
a fourth adhesive accommodating recess provided only at and along the a rear side edge of the second adhesive filling recess, the fourth adhesive accommodating recess being shallower than the second adhesive filling recess, and the fourth adhesive accommodating recess being shorter in width, which is a length in the perpendicular direction of the optical fiber, than the second adhesive filling recess; wherein
the second adhesive accommodating recess and the third adhesive accommodating recess are mutually connected between the first adhesive filling recess and the second adhesive filling recess.

5. The optical ferrule according to claim 1, wherein the second adhesive accommodating recess and the third adhesive accommodating recess are mutually connected so as to make a continuous adhesive accommodating recess.

6. The optical connector according to claim 4, wherein the second adhesive accommodating recess and the third adhesive accommodating recess are mutually connected so as to make a continuous adhesive accommodating recess.

* * * * *